Dec. 3, 1946.  B. F. LAWRENCE ET AL  2,412,050
ICE CREAM DISHER
Filed Jan. 29, 1945   2 Sheets-Sheet 1
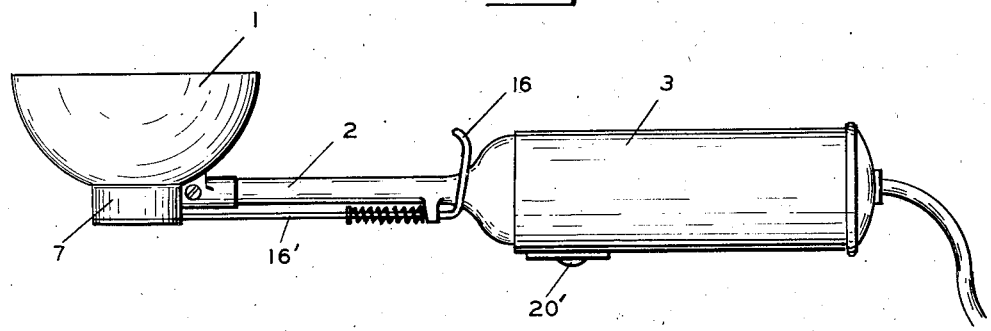
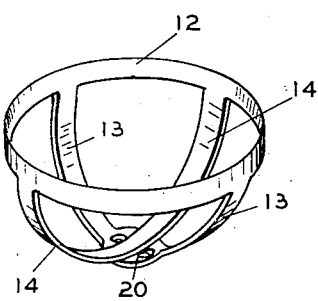
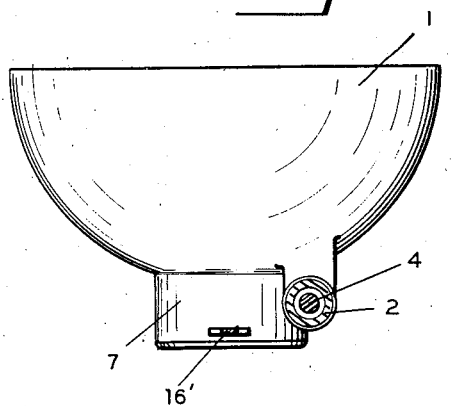
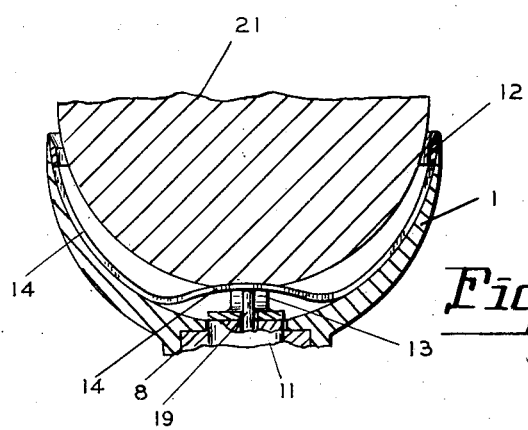
INVENTORS
BERT F. LAWRENCE
BY EMMA ETHEL LAWRENCE
ATTORNEY Dec. 3, 1946. B. F. LAWRENCE ET AL 2,412,050
ICE CREAM DISHER
Filed Jan. 29, 1945 2 Sheets-Sheet 2
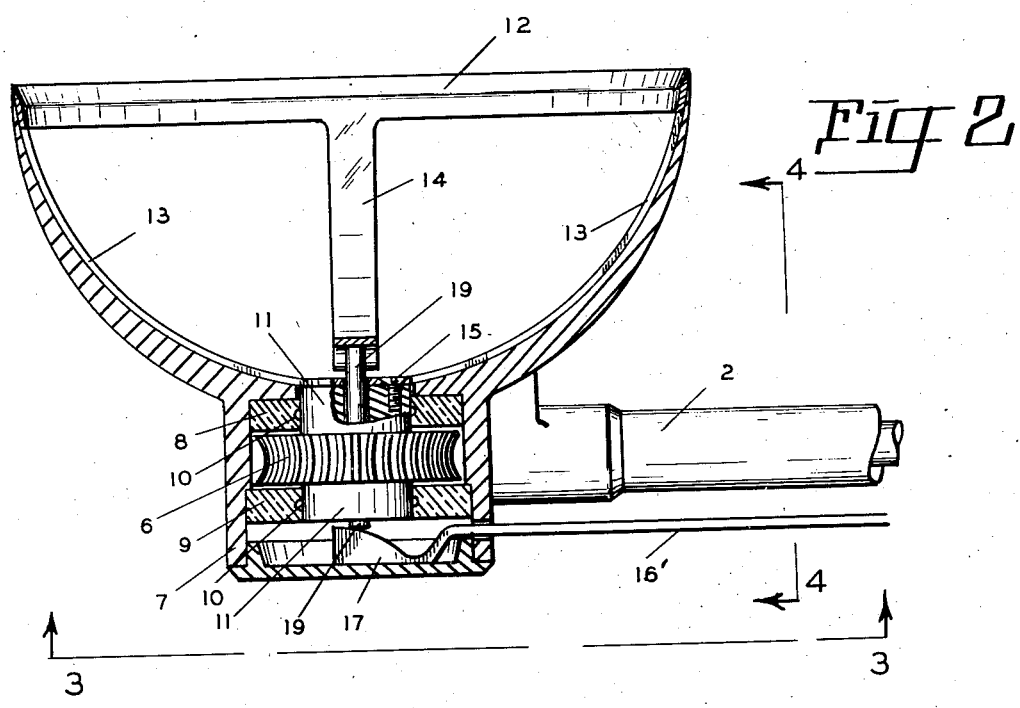
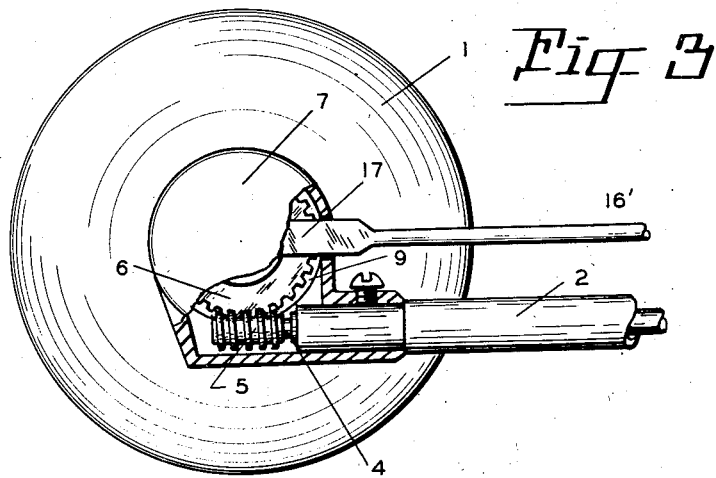
INVENTORS
BERT F. LAWRENCE
BY EMMA ETHEL LAWRENCE
ATTORNEY Patented Dec. 3, 1946

2,412,050

UNITED STATES PATENT OFFICE 2,412,050

ICE CREAM DISHER

Bert F. Lawrence and Emma Ethel Lawrence, Oregon City, Oreg.

Application January 29, 1945, Serial No. 575,067

4 Claims. (Cl. 107—48)

This invention relates to ice cream dishers and the primary object of the invention is to provide a power driven blade assembly within the bowl of the disher for cutting through the ice cream in the scooping operation.

A further object of the invention is to provide means within the bowl for disengaging the ice cream from the bowl and away from the cutting mechanism while dispensing the ice cream.

A still further object of the invention is to provide a driving means for operating the cutting blade that will be encased within the handle of the disher.

These and other incidental objects will be apparent in the drawings, specification and claims.

Referring to the drawings:

Figure 1 is a side view of the disher, illustrating an electric motor embodied within the handle of the disher.

Figure 2 shows an enlarged sectional view of the bowl and the cutting blade assembly.

Figure 3 is a fragmentary plan view, taken on line 4—4 of Figure 1.

Figure 4 is an end sectional view, taken on line 4—4 of Figure 2.

Figure 5 illustrates the cutting blade assembly in perspective and removed from the bowl.

Figure 6 is a fragmentary detail illustrating the method of removing the ice cream from the bowl.

Our new and improved ice cream disher consists of a scoop or bowl 1 fixedly mounted to the handle 2, and having an electric motor located within the enlarged portion 3 of the handle. This electric motor drives the shaft 4, and the worm 5. The worm is fixedly keyed to the shaft and drives the worm wheel 6 within the housing 7.

The worm wheel 6 is mounted within suitable bearings 8 and 9. These bearings are preferably made of a material requiring no oil lubrication, but having grooves 10 therein for maintaining a water type of lubrication, which has been found to be very satisfactory type of lubrication for this type of a device coming in contact with ice cream and the like. These bearings receive water lubrication from the dipping bowl that dishers are usually stored in and would require no further attention.

Fixedly secured to the hub 11 of the worm wheel 6 is a circular cutting blade 12. This blade carries scrapers 13 and 14. The scraper 13 is secured to the hub 11 by the bolts 15. The arms 14 simply connect to the cutting blade 12 and rests over the top of the scraper 13, best shown in Figures 2 and 5.

When the disher is dipped into the ice cream the blade 12 is driven at a suitable speed by the motor within the handle 3, shaft 4, worm 5 and worm wheel 6. When the bowl has been filled the ice cream can be removed therefrom by manipulating the lever 16 and shaft 16' operating the cam 17 within the housing 7, moving the plunger 19 longitudinally of the worm wheel assembly distorting or forcing the portion 20 of the scraper 14 towards the center of the disher, as best illustrated in the fragmentary view Figure 6, causing the ice cream to be disengaged from the scrapers 13, 14 and the cutting blade 12. The disengagement of the ice cream may be assisted by reversing the motor or starting and stopping the same abruptly by the control switch 20', the details of which I have deemed unnecessary to illustrate. The ideal way of disengaging the ice cream from the cutting blade 12 and the scrapers 13 and 14 is to provide a motor that can be started quickly with a jerk or stopped in the same manner, by so doing we provide the simplest possible way of disengaging the ice cream from the bowl. The ice cream may also be dispensed from the bowl by applying a brake to the motor.

Our new and improved disher is easy to keep clean as the rotation of the blade assembly 12, when immersed in water will scour the inner side of the bowl together with the scrapers 13 and 14 and the blade assembly. In the event it becomes necessary to disassemble the device the scrapers 13 and 14 may be removed by removing the bolts 15 and pulling the bearing assemblies 9 and 10 out of the housing 7, together with the worm wheel and its associated parts.

Having thus described the invention, what is claimed as new, is:

1. An ice cream disher including a bowl, a cutting blade arranged adjacent the edge of the bowl, a scraper attached to the cutting blade and fitting the inner surface of the bowl, a second scraper attached to the cutting blade but free from attachment to the first mentioned scraper, a motor for rotating the cutting blade and both the first and second mentioned scrapers, and mechanical means for distorting the central portion of the second mentioned scraper to eject the contained material from the bowl.

2. An ice cream disher as defined in claim 1, wherein the mechanical means for distorting the central portion of the second mentioned scrapers, includes a pin engaging said scraper, and a cam engaging the pin to force same against the scraper.

3. An ice cream disher, including a bowl, a hub movable through the center of the bowl, a cutter mounted on the hub and fitting the inner surface of the bowl, a pair of scrapers carried by the cutter and operating in the bowl, one of said scrapers being attached to the hub, said scrapers being free of each other, a motor for operating the hub and thereby the scrapers, and means operating through the hub for distorting a portion of the scraper which is free of the companion scraper to thereby force said scraper away from the surface of the bowl.

4. An ice cream disher including a bowl having a housing at its bottom, a cutting blade in the bowl adjacent the edge thereof, a pair of scrapers attached to the cutting blade, said scrapers being free of each other, a hub in the housing, means for attaching one scraper to the hub, a pin slidably mounted in the hub, a gear on the hub, a worm gear meshing with the gear on the hub, means extending from the housing to operate the gears, a cam slidably mounted in the housing and engaging one end of the pin to distort the free scraper and remove same from the surface of the bowl to eject the material therein.

BERT F. LAWRENCE.
EMMA ETHEL LAWRENCE.